May 26, 1953  H. H. ENGEMANN  2,639,531
SLIDE BINDER
Filed June 3, 1950

Inventor:
Herbert H. Engemann
By The Firm of Charles R. Hill Attys

Patented May 26, 1953

2,639,531

UNITED STATES PATENT OFFICE 2,639,531

SLIDE BINDER

Herbert H. Engemann, Cleveland, Ohio

Application June 3, 1950, Serial No. 165,992

13 Claims. (Cl. 40—158)

The present invention relates to a slide binder and more particularly to a binder for mounting and resiliently retaining a sheet or film material, such as a transparency, for projection or viewing.

In the art of photography, and more particularly home color photography, the medium conveniently employed for viewing a photograph is a colored transparency or film which is usually mounted within a binder for viewing or for projection onto viewing screens, or the like. Various types of slide binders have been proposed in the prior art but such binders have generally proved undesirable for several reasons.

The conventional type of slide binder is made of heavy cardboard or paper which positions and masks the film for convenient handling. The transparency is retained within the mask between a pair of glass plates which are then edge taped or otherwise secured to bind the plates, mask and transparency into a single unit. The mask partially covers the transparency edges, thereby producing an air space between the plates allowing the film to buckle, or otherwise distort, upon ageing or repeated use. The use of such a binding tape or mask requires considerable skill and time to prevent irreparable damage to the image, both in binding the transparency and in removing the same, if desired.

The prior art has also suggested the utilization of multi-part metallic slide binders which are crimped or otherwise distorted into contact with the glass plates between which the transparency is confined. Such metallic binders, however, are expensive and bulky in use and the total thickness of the bound slide is so great as to be inconvenient and generally unsuitable for use in various types of projectors.

The present invention now provides an improved slide binder which does away with the disadvantages hereinbefore enumerated by providing a simple, efficient, and economical means for retaining a transparency within a mounting unit. More particularly, the present invention contemplates the employment of a one-piece resilient metal envelope or binder which is adapted to receive therein a pair of glass mounting plates having interposed therebetween a desired transparency and a positioning frame. The binder or envelope thus comprises a single element which is reusable any number of times and which may be readily assembled and disassembled. Inasmuch as the glass plates are urged against the transparency by the resiliency of the metal binder or envelope itself, any tendency for the transparency to buckle is prevented, and the reduced thickness and general convenience of the binder of the assembly will be readily appreciated by those familiar with the devices heretofore commercially available.

It is, therefore, an important object of the present invention to provide a simple, readily employed, and inexpensive slider binder for a photographic impression.

Another important object of the present invention is to provide a slide binder for a photographic transparency or the like within which the transparency is retained between a pair of glass plates resiliently loaded into surface contact with the transparency to prevent buckling thereof.

It is a further important object of the present invention to provide an improved photographic slide binder including a one-piece metal envelope resiliently enclosing and urging together a pair of rigid transparent plates having interposed therebetween a photographic transparency.

Still another important object of the present invention is to provide a slide binder including a positioning frame for positioning and masking a film transparency, a pair of glass plates urged against opposing surfaces of the frame and a metal binder resiliently clipped onto the plates and urging the same together for confining the frame and transparency therebetween while permitting adjustment of the plates and the frame to a desired position relative to the binder and the transparency.

Other and further important objects of this invention will be apparent from the disclosures in the specification and the accompanying drawings.

Figure 1:
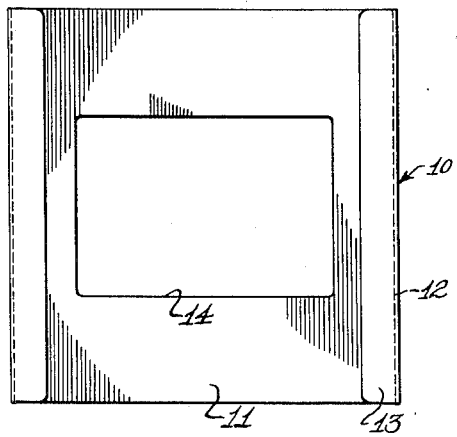
Figure 1 is a rear elevational view of a binder of the present invention.
Figure 2:
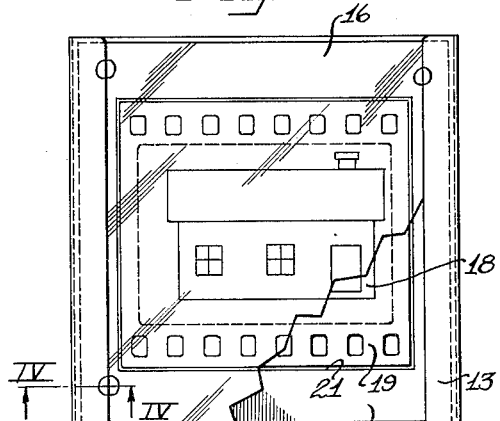
Figure 2 is a rear elevational view, with parts broken away, illustrating the assembly of a transparency within the binder of Figure 1.
Figure 3:
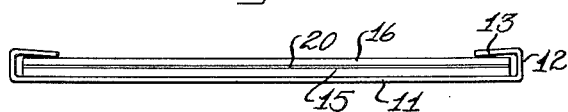
Figure 3 is an end view of the assembly of Figure 2.
Figure 4:
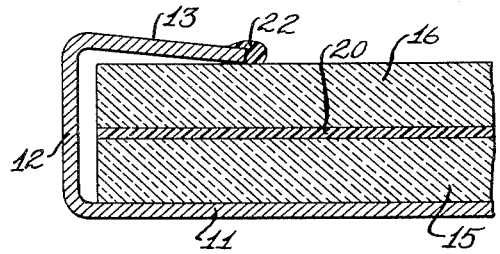
Figure 4 is a sectional view taken along the plane IV—IV of Figure 2.

In Figure 1 reference numeral 10 refers generally to a slide binder of the present invention including a central web portion 11 of generally rectangular outline and provided with opposing upturned end flanges 12 (Figure 3) terminating at inturned terminal projections 13 inclined downwardly and inwardly toward the center of the web portion 11. The web portion 11 is provided with a central generally rectangular aperture 14 of suitable size for framing a desired transparency. It will be appreciated that the size of the slide binder 10, the height of the flanges 12, and the size and outline of the aperture 14 may be varied as desired for employment in conjunction with various sizes and types of photographic images or transparencies.

Figure 5:
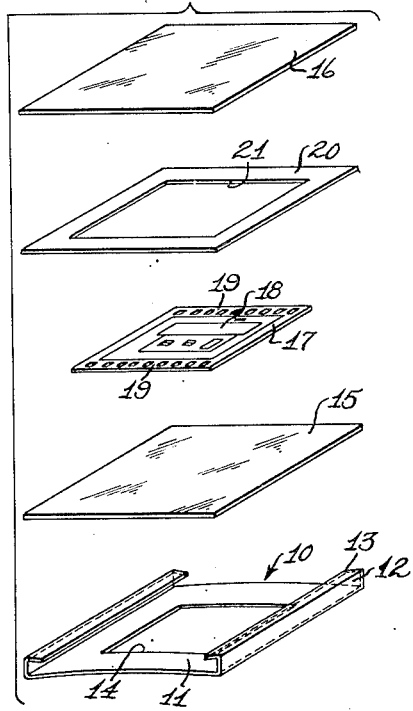
Figure 5 is an exploded perspective view of the assembly of Figure 2.
Figure 6:
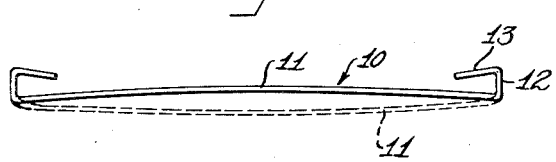
Figure 6 is an end elevational view of the binder of Figure 1 illustrating resilient deformation of the binder during assembly.

As best shown in Figures 5 and 6, the web portion 11 of the binder 10 is bowed from a planar configuration toward the overlying terminal projection 13, and the metallic stock from which the binder 10 is formed is of sufficient thinness to be resilient so that upon squeezing or compressing the flanges 12 inwardly toward one another the web 11 may be sprung downwardly, as indicated in dotted outline in Figure 6, to permit the insertion of a slide or transparency assembly between the web 11 and the projection 13. The flanges 12 and projections 13 thus form with the web 11 resilient U-shaped channels with sufficient spring bias to retain the insert.

The slide or transparency binder assembly is best illustrated in Figures 2–5 and includes an inner transparent or glass plate 15, an outer glass plate 16, a photographic transparency 17 having a central image 18 and conventional perforated opposed marginal edge portions 19, and a rectangular positioning frame 20 having a central generally rectangular aperture 21. It will be seen from Figures 2–5 that the positioning frame 20 and the transparency 17 are interposed between the glass plates 15 and 16, the positioning frame aperture 21 being of such size as to enclose the transparency 17 in closely spaced relation, thereby providing means for positioning the transparency in a desired position between the glass plates 15 and 16. Similarly, the aperture 14 in the binder web portion 11 is of sufficient size to permit the viewing of the image 18 of the transparency 17, while masking the perforated edge portions, or any other undesirable portions, of the transparency.

The assembly of the slide, or binder, is quite simple and involves merely the squeezing of the flanges 12 of the binder toward one another to spring the resilient web portion downwardly to the dotted position of Figure 6 and the insertion of the sub-assembly sandwich, consisting of the glass plates 15 and 16, the transparency 17 and the frame 20, in position within the binder to be confined between the lateral edge of the projections 13 and the web portion 11. The sub-assembly sandwich is then positioned within the binder so that the image 18 of the transparency is visible through the aperture 14, and the flanges 12 are then released to permit the web portion to spring against the inner glass plate 15.

The concavo-convex configuration of the web portion 11 insures elongated resilient contact between the binder and the glass plate 15, the contact urging the sandwich into snug fitting relation between the terminal portions 13 and the web portion 11, thus preventing possible shifting of the sandwiched sub-assembly within the binder. To further insure the rigid positioning of the sub-assembly within the binder, an adhesive material, such as a quick-drying paint, may be placed, as at 22, to overlie the binder portions 13 and the adjacent plate 16 to bind the sandwiched sub-assembly against shifting movement within the binder. This adhesive or paint seal can be readily broken with a knife if it is desired to remove the sandwich from its assembled position within the binder.

Figure 7:
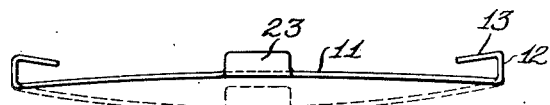
Figure 7 is an end view similar to Figure 6 of a modified form of binder of the present invention.

In the modified form of binder illustrated in Figure 7, the web portion 11 of the binder is provided with upstanding tabs 23 at each longitudinal edge intermediate the flanges 12. Deformation of the binder during assembly is sufficient to lower the tabs 23 beneath the sandwich as the same is inserted within the binder, thereby accommodating assembly as hereinbefore discussed, while release of the flanges 12 will permit the tabs to return to their original position, as shown in full outline. It will be appreciated that the tabs 23 will prevent sliding movement of the sandwich sub-assembly from its adjusted position between the binder 12.

The advantages residing in the present invention will be evident to those skilled in the art. It would be noted that the lateral length and the transverse width of the web portion 11 are slightly greater than the corresponding dimensions of the glass plates 15 and 16, thereby permitting lateral and transverse shifting movement of the sandwich within the binder to accurately position the desired portion of the transparency 18 for viewing through the binder aperture 14. Also, it will be seen from Figure 4 that the downwardly inclined projection 13 permits the employment of upstanding flanges 12 of slightly greater height than the height of the sandwiched sub-assembly to further facilitate such adjustment against the resilient load imposed on the sub-assembly of the concavo-convex web portion 11.

The resilient loading of the glass plates with the transparency and positioning frame in elongated flat-wise face contact with the plate insures the prevention of buckling of the transparency during use, as well as the accurate retention of the positioning frame and the transparency itself within the binding assembly. The small overall dimensions of the slide binder assembly in relation to the slide binders previously employed will likewise be appreciated by those skilled in the art, inasmuch as the ease of handling and the ready insertion of the assembly within a slide projector, or similar viewing apparatus, is evident. The actual thickness of the assembly comprises the transparency thickness, plus the thickness of a pair of glass plates, plus the thickness of metal or other material forming the binder itself.

It will be understood that modifications and variations may be effected without departing from the scope of the novel concepts of the present invention.

I claim as my invention:

1. A slide binder for a photographic transparency assembly comprising a central normally concavo-convex web portion formed of resilient material and having a central aperture through which a transparency retained by the binder may be viewed, and means formed integrally with the web portion and extending in spaced relation thereto to bear against a rigid transparency assembly interposed between the web portion and said means.

2. A slide binder for a photographic transparency comprising a normally concavo-convex resilient sheet metal binder having a centrally apertured web portion and integrally formed inturned terminal flanges cooperating with the convex face of said web portion to retain said transparency therebetween.

3. A slide binder assembly comprising a positioning frame having a central aperture adapted to receive a photographic transparency or the like, a pair of transparent rigid plates in extended surface contact with said frame on opposing sides thereof, and a resilient slide binder having spaced engaging surfaces engaging exterior surfaces of said transparent plates and urging said plates together with said frame therebetween, one of said surfaces being defined by a normally concavo-convex centrally apertured web member.

4. A slide binder assembly comprising a binder having a resilient normally concavo-convex web portion provided with a central aperture and opposing inturned portion in spaced relation to said web portion, and a pair of glass plates interposed between said engaging portion and adapted to receive therebetween a photographic transparency in extended flat-wise surface engagement with said plates.

5. A slide binder assembly comprising a resilient metallic binder having an apertured normally concavo-convex web portion, integral opposed terminal flanges on said web lying approximately normal to the plane of said web portion, inturned projections on said flanges lying in a plane substantially parallel to that of said web portion, a pair of transparent plates snugly insertable between said web portion and said terminal projections, and a positioning frame interposed between said glass plates and having a central aperture for alignment with the aperture of said binder.

6. A slide binder assembly comprising a generally U-shaped resilient metal binder having channels along opposing sides thereof and a normally concavo-convex web having a central aperture, a pair of glass plates snugly insertable in said opposed channels and resiliently retained thereby against said shifting movement, and a positioning frame interposed between said glass plates and having a central aperture for alignment with that of said binder.

7. A slide binder assembly comprising a binder having a resilient normally concavo-convex web portion provided with a central aperture and channels at opposed sides thereof, said channels providing legs overlying said web in spaced relation thereto, and a pair of substantially plane glass plates interposed between said legs and said web portion with said web portion resiliently seated against one plane surface of one of said plates to urge said plates against said legs, whereby buckling tendencies of a film transparency interposed between said plates are resisted.

8. A slide binder assembly comprising a binder having a generally concavo-convex central web portion having a viewing aperture therein and opposing end channels formed integrally therewith to provide elongated inturned legs in spaced relation to said web portion, a pair of glass plates inserted between said leg portions and said web in alignment with said central aperture, and a film transparency interposed between said plates in extended flatwise surface contact therewith, desired portions of said transparency being aligned with said web aperture for viewing therethrough.

9. A slide binder assembly comprising a binder having a central web portion of concavo-convex lateral configuration, elongated integrally formed edge flanges lying normal to said web portion, and inturned terminal legs inclined inwardly toward said web portion, said web portion being resiliently deformable from its concavo-convex configuration to a convexo-concave configuration upon inward movement of said flanges, a pair of glass plates insertable between said web portion and said end projection upon resilient deflection of said web portion to convexo-concave configuration, and a film transparency interposed between said plates in flatwise contact therewith with said resilient web portion and said projections urging said plates together to prevent buckling of said transparency.

10. A slide binder assembly comprising a binder having a normally concavo-convex web portion provided with a central aperture and elongated opposing end channels, a pair of glass plates insertable within said channel into extended surface contact with said web portion so as to distort said web portion to a substantially planar shape and having transverse and lateral dimensions somewhat less than those of said web portion, and a photographic transparency interposed between said glass plates and in flatwise surface contact therewith, the larger dimensions of said web portion permitting adjustment of said plates when retained thereby to bring the image of said transparency into registry with the aperture of said web portion.

11. A slide binder assembly comprising a substantially plane central web portion having opposing terminal end channels and upstanding marginal tabs therebetween, and a pair of glass plates having marginal portions positioned in said channels and in extended flatwise contact with said web portion, said web portion being deflectable to a convexo-concave configuration for insertion of said glass plates in said channels, said web portion when so deflected moving said tabs from the plane of said web portion to receive said plates thereover.

12. A protective mounting for films and the like comprising a resiliently deflectable plate having an aperture therethrough and overhanging portions along opposed sides thereof, said plate in its free state being convexly bowed on the side thereof receiving the overhanging portions thereover, and a multiple flat film carrier stack adapted to be mounted on the convex face of the plate and held by the overhanging portions to flatten the plate and align a film therein with the plate aperture whereby the resiliency of the plate on attempting to reclaim its bowed free state condition will grip the stack and provide a tight assembly.

13. A resilient metallic clip of substantially rectangular shape having a central portion that is inwardly bowed and apertured and two opposed edges of said central portion being provided with substantially parallel and integrally formed U-shaped channels having sufficient resiliency to permit an insert to be held in aperture spanning position by the spring bias of the resilient channels.

HERBERT H. ENGEMANN.

References Cited in the file of this patent

UNITED STATES PATENTS

| Number | Name | Date |
| --- | --- | --- |
| 2,184,007 | Staehle | Dec. 19, 1939 |
| 2,271,530 | Wick | Dec. 3, 1942 |
| 2,359,659 | Marguiles | Oct. 3, 1944 |
| 2,490,058 | Jablon | Dec. 6, 1949 |
| 2,586,176 | Olsen | Feb. 19, 1952 |

FOREIGN PATENTS

| Number | Country | Date |
| --- | --- | --- |
| 691,587 | Germany | May 31, 1940 |